United States Patent
Adcock et al.

(10) Patent No.: US 7,325,198 B2
(45) Date of Patent: Jan. 29, 2008

(54) CALENDAR-BASED INTERFACES FOR BROWSING AND MANIPULATION OF DIGITAL IMAGES

(75) Inventors: John E. Adcock, Menlo Park, CA (US); Andreas Girgensohn, Menlo Park, CA (US); Lynn D. Wilcox, Palo Alto, CA (US); David M. Hilbert, San Jose, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 719 days.

(21) Appl. No.: 10/334,473

(22) Filed: Dec. 31, 2002

(65) Prior Publication Data

US 2004/0125150 A1 Jul. 1, 2004

(51) Int. Cl.
*G06F 3/00* (2006.01)

(52) U.S. Cl. .................................... 715/722
(58) Field of Classification Search ............ 715/838, 715/722, 963
See application file for complete search history.

(56) References Cited

U.S. PATENT DOCUMENTS

| | | | |
|---|---|---|---|
| 6,006,227 A | 12/1999 | Freeman | |
| 6,580,437 B1* | 6/2003 | Liou et al. | 715/719 |
| 6,590,585 B1* | 7/2003 | Suzuki et al. | 715/719 |
| 6,809,724 B1* | 10/2004 | Shiraishi et al. | 345/169 |
| 6,996,782 B2* | 2/2006 | Parker et al. | 715/764 |
| 7,003,737 B2* | 2/2006 | Chiu et al. | 715/848 |
| 2002/0087969 A1* | 7/2002 | Brunheroto et al. | 725/13 |
| 2002/0140820 A1* | 10/2002 | Borden, IV | 348/207.99 |
| 2004/0100506 A1* | 5/2004 | Shiota et al. | 345/838 |

OTHER PUBLICATIONS

Canon Inc., ZoomBrowser EX, http://www.powershot.com/powershot2/software/ps_pc_software.html.
ACD System, ACD See http://www.acdysystems.com/English/Products/ImagingProducts/Featured1/index.htm.
Palm Inc., Palm Desktop Software for Windows, http//www.palm.com/software/desktop/index.html.

(Continued)

*Primary Examiner*—Kristine Kincaid
*Assistant Examiner*—Le Nguyen
(74) *Attorney, Agent, or Firm*—Fliesler Meyer LLP

(57) ABSTRACT

Embodiments of the present invention provide the ability to navigate, view, and manipulate a collection of digital images utilizing a GUI that has the familiar context of a calendar. Graphical objects representative of digital images are displayed within a particular day displayed in a calendar-based GUI. A user may group digital images into groups, modify the date with which a digital image is associated and perform various other manipulations using embodiments of a calendar-based GUI.

11 Claims, 19 Drawing Sheets

OTHER PUBLICATIONS

AT&T Laboratories, Cambridge, ShoeBox digital photo management system, http://www.uk.research.att. com/dart/shoebox.

Nayaka, Rion, http://www.rion.nu/photospace/.

Hull, J. and Hart, P., "Toward Zero-Effort personal Document Management," IEEE Conmputer, pp. 30-35, Mar. 2001.

Microsoft, Inc., Seattle, WA, Outlook Information Management Application, http://www.microsoft.com/office/outlook/default.asp.

Sun, Y., et al., "*MyPhotos*—A System For Home Photo Management and Processing," Microsoft Research Asia, ACM Multimedia conference, Dec. 2002.

Fertig, S., et al., "Lifestreams: An Alternative to the Desktop Metaphor," Department of Computer Science, Yale University, New Haven, Connecticut 06520, 1996; http://www.acm.org/sigchi/chi96/proceedings/videos/Fertig/etf.htm.

"Brief Tour of *e*Cabinet," Ricoh Company Ltd., Ricoh Silicon Valley, Inc., pp. 1-14, 2001.

* cited by examiner

FIG. 1

```xml
<?xml version="1.0"?>
-<photodata>
    -<photo>                          ─ 1601
        <path>P1010032.JPG</path>
        <time>2001:02:01 07:00:00</time>
        <filedate/>              ── 1605
        <width>640</width>    1603
        <height>480</height>          ─ 1611
           -<property-item key="people">
                <person id="Hilbert"/>  ─ 1613
           </property-item>
              -<property- key="event"> ── 1617
                  <event id="010201-010215" />
           </property>                  ── 1619
    </photo>
    -<photo>
        <path>P1010037.JPG</path> ── 1621
        <time>2001:02:01 00:00:00</time>
        <filedate/>
        <width>640</width>
        <height>480</height>
           -<property- key="event">
                <event id="010201-010215" />
           </property>
    </photo>
    -<photo>
        <path>P1010041.JPG/path> ── 1631
        <time>2001:02:01 00:00:00</time>
        <filedate />
        <width>640</width>
        <height>480</height>
           -<property-item key="people">
                <person id="Hilbert" />
           </property-item>
              -<property- key="event">
                  <event id="010201-010215" />
           <property>
    </photo>
    -<photo>
        <path>P1010051.JPG</path> ── 1641
        <time>2001:02:01 00:00:00</time>
        <filedate/>
        <width>640</width>
        <height>480<height>
           -<property- key="event">
                <event id="010201-010215" />
           </property>
    </photo>
</photodata>
```

FIG. 16

CALENDAR-BASED INTERFACES FOR BROWSING AND MANIPULATION OF DIGITAL IMAGES

FIELD OF THE INVENTION

The present invention, roughly described, relates to the display of digital images in a Graphical User Interface ("GUI"), and more particularly to the display of digital images in a calendar-based Graphical User Interface.

BACKGROUND

The popularity and case of use of digital cameras is contributing to the creation of large collections of digital images. The great majority, if not all, of modem digital cameras embed a header of information within a captured digital image. The header of information often includes (but is not limited to) a creation time, creation date, camera make and model, image width and height, exposure information (e.g., flash on/off, aperture value, exposure time), focus time, focus distance, focal length, etc. That information will be referred to throughout this application as "header information."

Collections of digital images increase the need for GUIs that enable a user to efficiently browse and manipulate those images. Some current GUIs group digital images within a hierarchical framework similar to, or even directly based upon, a multi-level file system. Typically, within each folder of the file system, the digital images may be viewed as "thumbnails," and possibly sorted by file attributes or embedded header information (e.g., date taken, size, name). A "thumbnail" as described herein is a small graphical representation of a larger image.

SUMMARY

Roughly described, an aspect of the invention includes a graphical user interface for displaying a digital image to a user. A graphical object representative of the digital image is displayed within the familiar context of a graphical calendar. In one example, the graphical object is displayed at a location within the graphical calendar that corresponds to a date associated with the digital image.

According to another aspect, the invention includes a method for organizing and displaying to a user a plurality of digital images. In one example, the method includes the steps of obtaining a plurality of digital images, and generating a database containing information for each of the plurality of digital images. Additionally, a graphical calendar is displayed to a user and a plurality of graphical objects are displayed within the calendar at distinct locations, wherein each graphical object represents at least one of the digital images.

According to still another aspect, a computer readable product is provided that includes a computer usable medium having computer readable program code means embodied therein for displaying to a user a graphical calendar interface for navigating and manipulating a plurality of digital images. The computer readable program code means provides the ability to display a graphical user interface including a graphical calendar and a plurality of graphical objects representative of at least a portion of said plurality of digital images positioned at distinct locations within said graphical calendar. Additionally, computer readable program code means may also be included for receiving an input from said user to alter the display of said graphical user interface and, for receiving an input from said user to alter a location of at least one of said plurality of graphical objects.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 illustrates a calendar-based GUI in a year view, according to an embodiment of the present invention;

FIG. 16 is an example of database contents generated using the process described with respect to FIG. 15;

DESCRIPTION

Embodiments of the present invention provide the ability to navigate, view, and manipulate a collection of digital images utilizing a GUI that has the familiar context of a calendar. Graphical objects representative of digital images are displayed within a particular day displayed in a calendar-based GUI. A digital image may be associated with a particular day based on a creation date of the digital image, a creation date of the file, or based on a date provided by a user.

Examples of calendar-based GUIs according to embodiments of the present invention are illustrated in FIGS. 1-12, 17, and 19. Each day within the calendar includes graphical object(s) (e.g., thumbnail) representative of digital images associated with that day. Controls may be provided within the GUI to allow the user to decrease (zoom in) or increase (zoom out) the number of days, weeks, or months shown in the current calendar view as well as to navigate in time by year, month, week, or day. Graphical objects of the digital images may be re-sized to fill the available space within the appropriate calendar day as the view changes.

Figure 2:
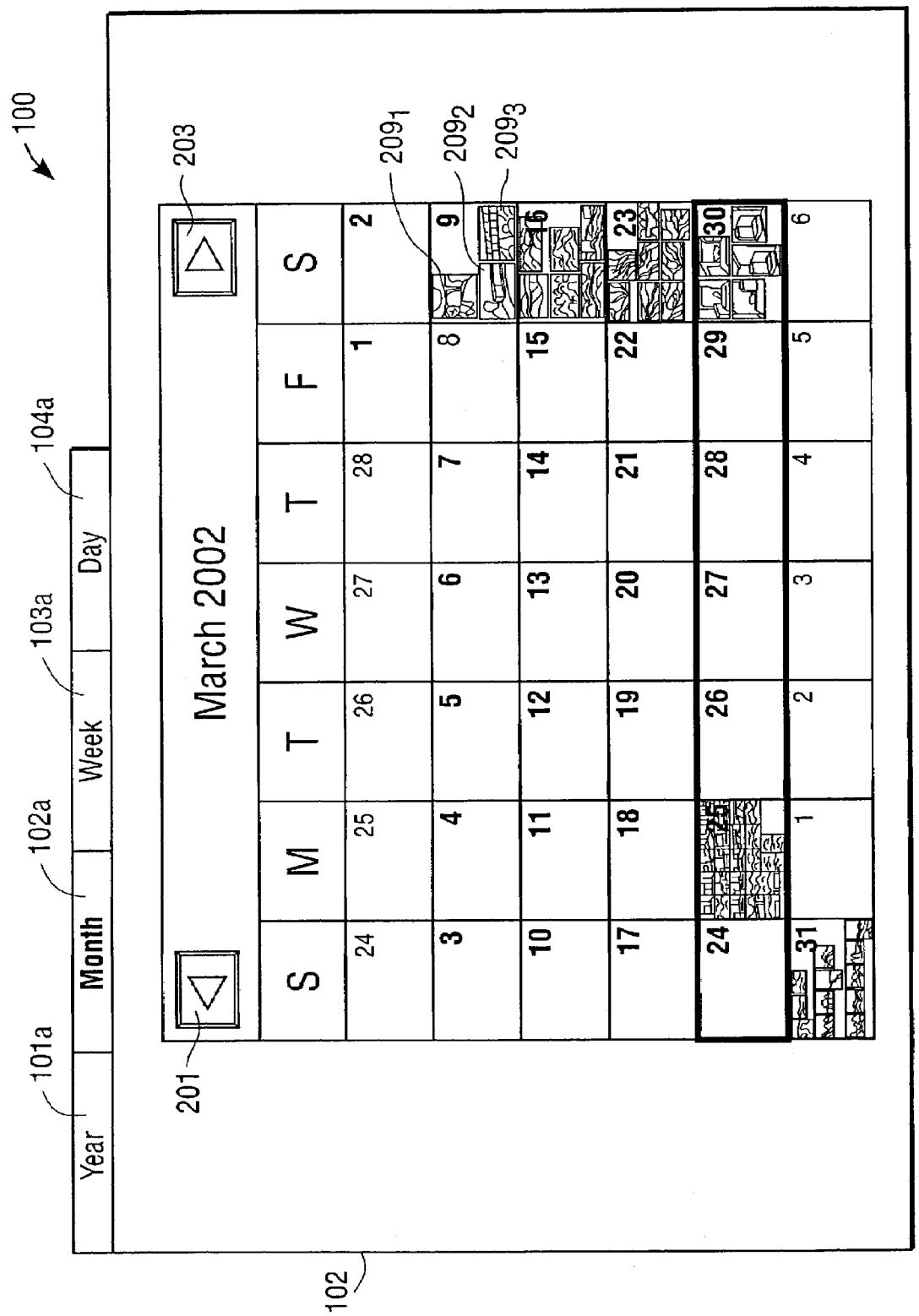
FIG. 2 illustrates a calendar-based GUI in a month view, according to an embodiment of the present invention.

In another example, multiple digital images associated with a given day may be represented by a subset of graphical objects or even by a single graphical object, as illustrated in FIG. 2. The display of a single graphical object or subset of graphical objects is beneficial when the view within the calendar is such that useful information cannot be provided if a distinct graphical object is displayed for each digital image.

In still another embodiment, the quantity of digital images associated with a particular day may be illustrated by displaying a graphical object within the appropriate day with a color intensity or luminance proportional to the number of images associated with that day. Font size and weight of the calendar date for a particular day may also be modified to reflect the number of images associated with that date. In an alternative embodiment, a number may be illustrated within the calendar date to identify the number of digital images associated with that day.

Figure 1:
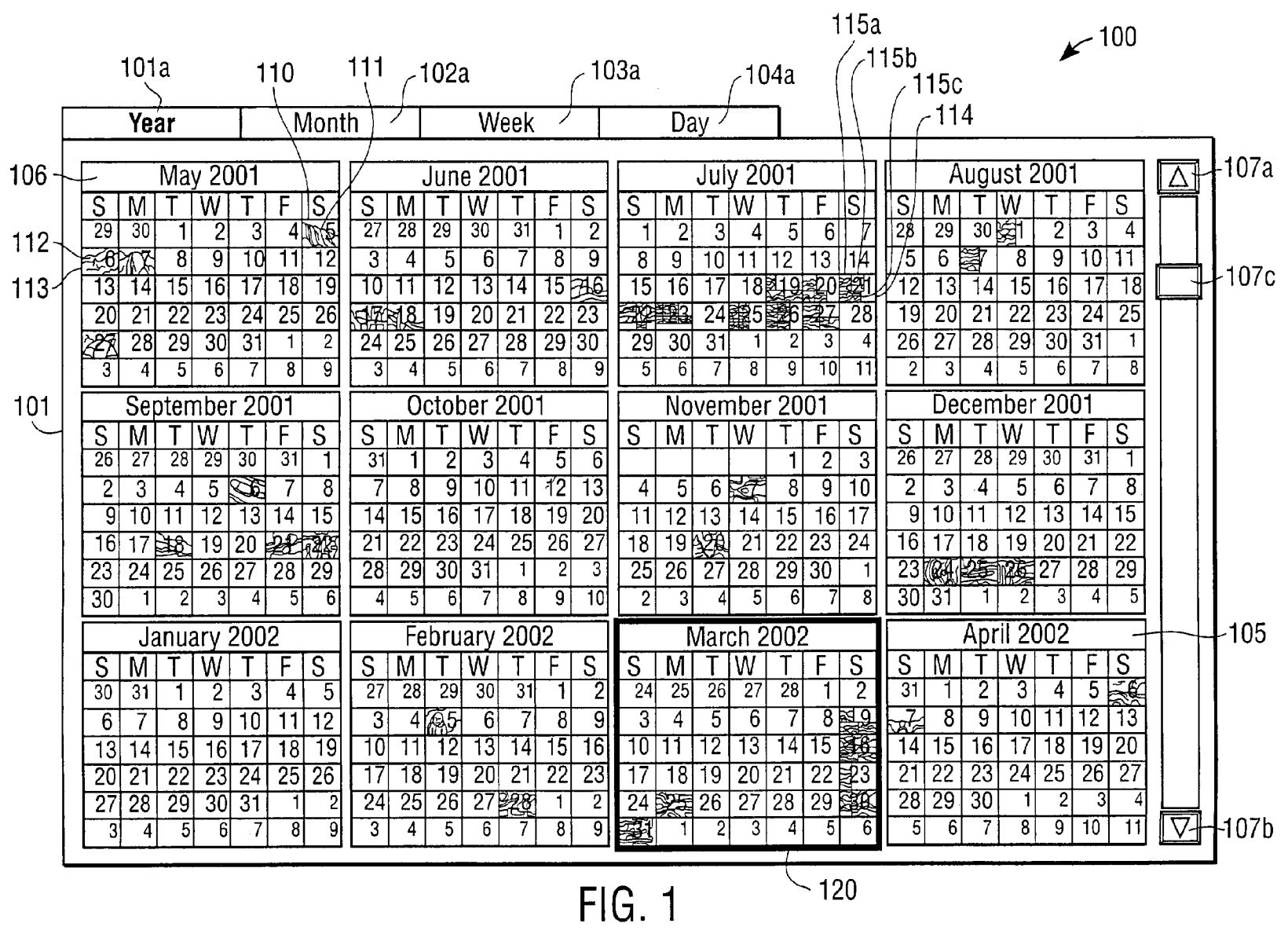

FIGS. 1-6B illustrate different views of the calendar-based GUI, according to embodiments of the present invention. FIG. 1 illustrates a calendar-based GUI 100 in a year view 101 displaying months ranging from May, 2001 106 to Apr., 2002 105, according to an embodiment of the present invention. A user may modify the display of months represented in a year view 101 using control arrows 107a, 107b, or scroll bar 107c. As illustrated in FIG. 1, twelve months are shown but, any number of months can be included in year view 101.

On each day within each month displayed within year view 100 that a digital image is associated, a graphical object is illustrated within that calendar date to illustrate that digital images are associated with that date. For example, graphical object 110 is illustrated on calendar date May 5, 2001 111 illustrating that a digital image is associated with May 5, 2001. For a day having multiple digital images associated with it, a single representative graphical object may be displayed (e.g., one graphical object 112 is illustrated on date May 6, 2001 113 as a representative of several digital images). Alternatively, multiple graphical objects may be displayed on a single date, each graphical object representing one or more digital images. For example, on calendar date Jul. 21, 2001 114, three different graphical objects are displayed 115a, 115b and 115c.

Figure 3:
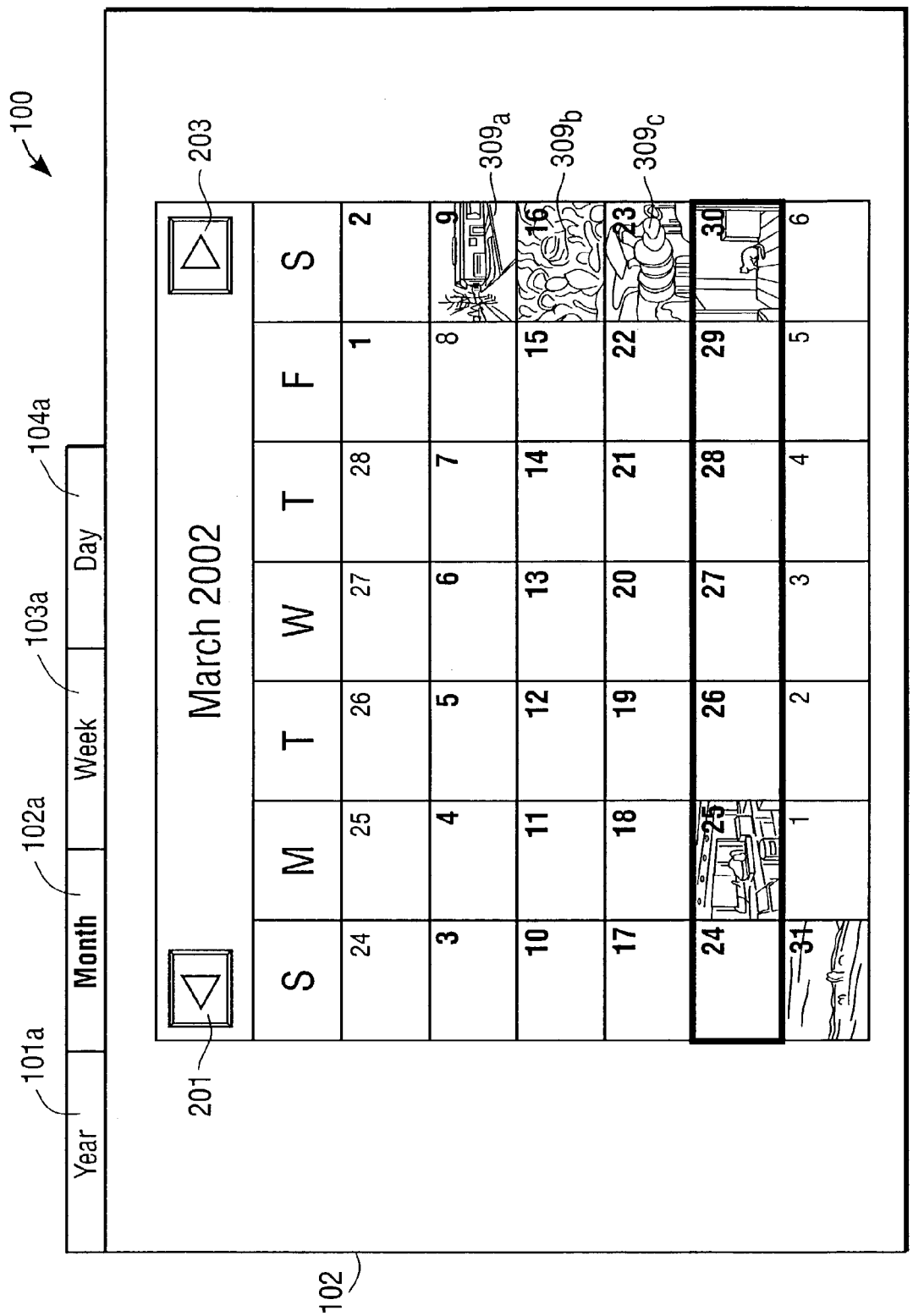
FIG. 3 illustrates a calendar-based GUI in an alternative month view, according to an embodiment of the present invention.

Navigation between views (year, month, week, day) may be accomplished using tabs 101a, 102a, 103a, and 104a, according to an embodiment of the present invention. Additionally, if a user selects a particular month to which they wish to navigate from within year view 101, a bold frame is displayed around the month and the user may select month tab 102a, and the view will change to a month view (as seen in FIGS. 2 and 3). For example, referring to the calendar month March, 2002, a bold frame 120 is displayed around that month to indicate that it has been selected by a user and upon selection of month tab 102a, the GUI 100 view changes to a month view, as seen in FIG. 2.

FIG. 2 illustrates a month view 102 of a calendar-based GUI 100, according to an embodiment of the present invention. Within month view 102, a user may navigate to different months using control arrows 201 or 203. Digital images associated with days of the displayed month may be represented as individual graphical objects, e.g., $209_1$, $209_2$, $209_3$ for a corresponding date as illustrated in FIG. 2. Alternatively, as illustrated in FIG. 3 a single graphical object, e.g., $309_a$, $390_b$, $309_c$ may be displayed for each date for which digital images are associated.

From within month view 102, a user may alter the display to illustrate a year view, week view, or day view by selecting year tab $101_a$, week tab $103_a$ or day tab $104_a$. Additionally, if a user wishes to view a particular week, it may select the desired week and, upon selection of week tab $103_a$, a week view is displayed in GUI 100, as illustrated in FIG. 4.

Figure 4:
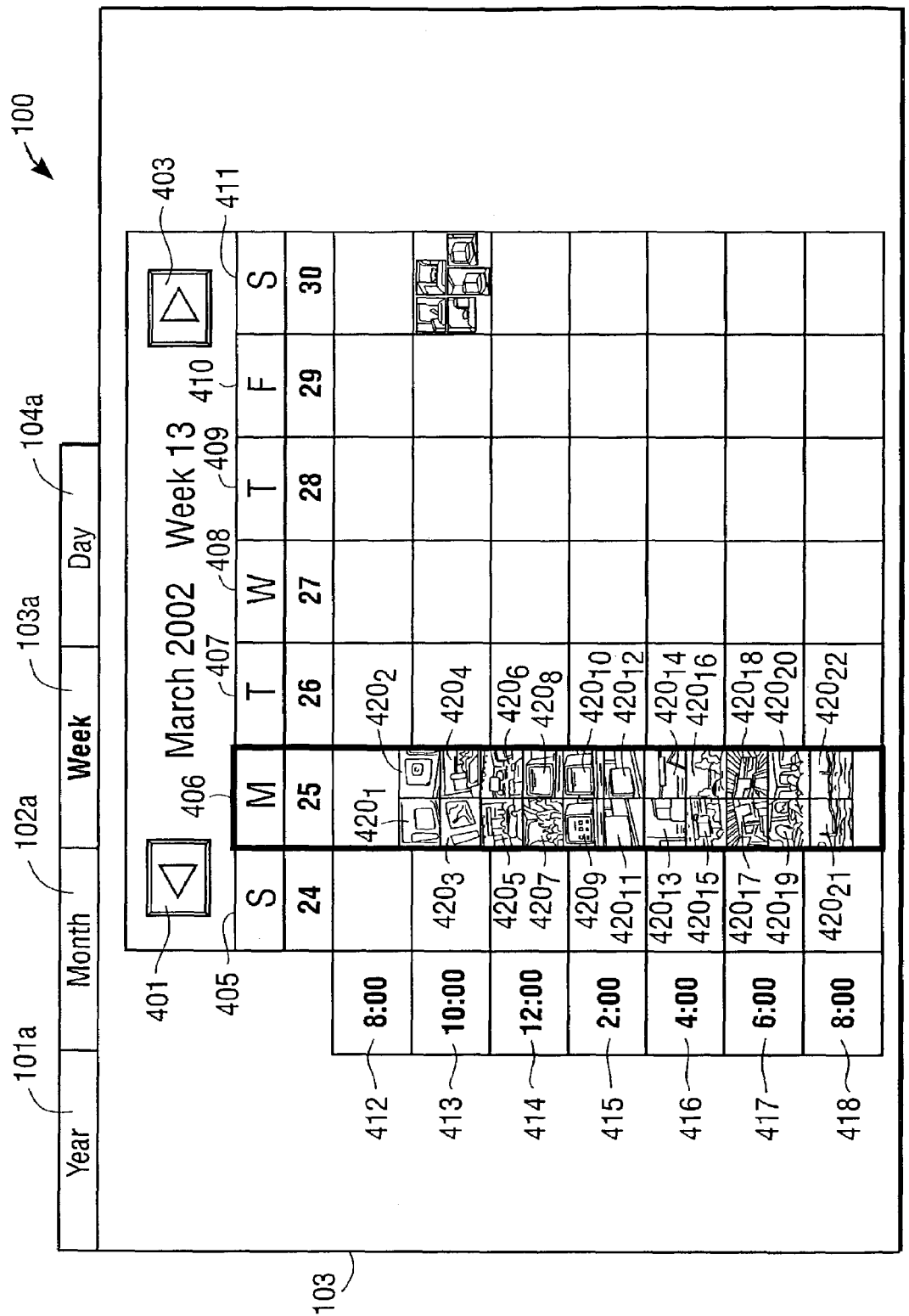
FIG. 4 illustrates a calendar-based GUI in a week view, according to an embodiment of the present invention.

FIG. 4 illustrates a calendar-based GUI 100 in a week view 103, according to an embodiment of the present invention. A user may navigate to different weeks within this view using control arrows 401 or 403. In an embodiment, week view 103 is displayed as seven days represented in columns 405, 406, 407, 408, 409, 410 and 411, each column divided by rows 412, 413, 414, 415, 416, 417, and 418, representing the time within each day. Rows 412-418 may be adjusted to display hours within the days or in more detail, minutes within the days. Additionally, more or fewer rows 412-418 and/or more or fewer columns 405-411 may be displayed within week view 103.

In week view 103, graphical objects representative of digital images associated with the displayed days are arranged in that day's column and based on a time for that day. For example, images $420_1$, $420_2$, $420_3$, $420_4$, $420_5$, $420_6$, $420_7$, $420_8$, $420_9$, $420_{10}$, $420_{11}$, $420_{12}$, $420_{13}$, $420_{14}$, $420_{15}$, $420_{16}$, $420_{17}$, $420_{18}$, $420_{19}$, $420_{20}$, $420_{19}$, $420_{20}$, $420_{21}$, $420_{22}$, are all associated with Mar. 25, 2002. Additionally, digital images $420_1$, through $420_{22}$ are arranged within column 406 for the date Mar. 25, 2002 based on a time with which the digital images are associated (e.g., based upon the time the digital image was created), as can be seen by their location relative to rows 412-418.

Within week view 103, a user may select a particular day for which it wants to view more information. For example, if a user selects Mar. 25, 2002, a bold indicator 430 is displayed around Mar. 25, 2002 and upon selection of day tab $104_a$, calendar-based GUI 100 displays the selected day in detail, as illustrated by FIG. 5.

Figure 5:
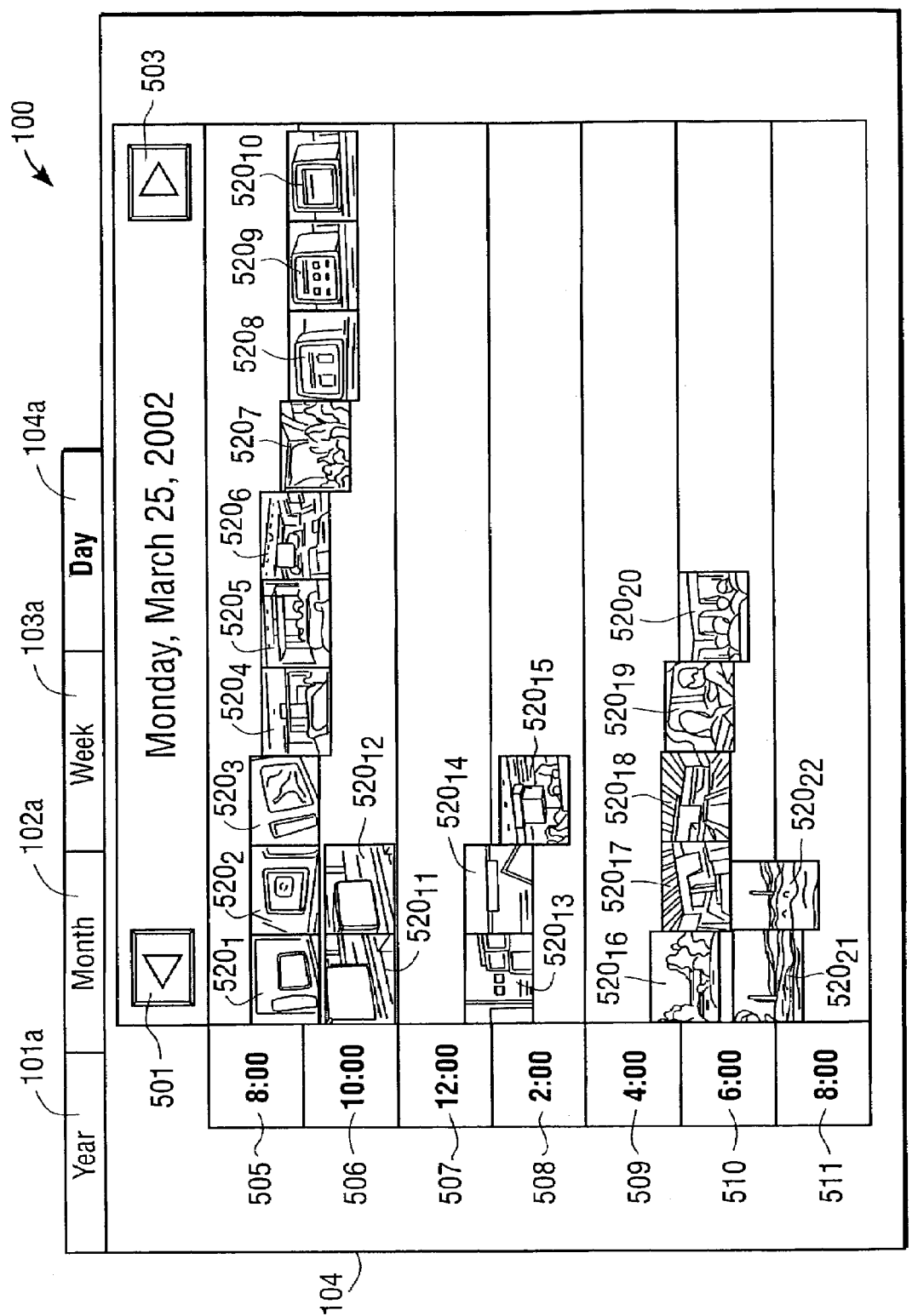
FIG. 5 illustrates a calendar-based GUI in a day view, according to an embodiment of the present invention.

FIG. 5 illustrates calendar-based GUI 100, displaying a day view 104, according to an embodiments of the present invention. A user may navigate to different days within day view 104 by selecting control arrows 501 and 503. Day view 104 is arranged in rows 505, 506, 507, 508, 509, 510, 511, representing times within the displayed day. Graphical objects $520_1$, $520_2$, $520_3$, $520_4$, $520_5$, $520_6$, $520_7$, $520_8$, $520_9$, $520_{10}$, $520_{11}$, $520_{12}$, $520_{13}$, $520_{14}$, $520_{15}$, $520_{16}$, $520_{17}$, $520_{18}$, $520_{19}$, $520_{20}$, $520_{21}$, $520_{22}$, are displayed within locations of rows 505 through 511 representative of the time on the particular day at which the corresponding digital image is associated. For example, graphical object $520_{20}$ illustrates that the represented digital image is associated with approximately 6:00 on Mar. 25, 2002.

As can be seen from FIGS. 1-5, as the views are enlarged the arrangement of graphical objects within each calendar day is updated to take advantage of the available display space within the calendar-based GUI 100. Additionally, within each day, graphical objects may be sorted by time—when views spanning less than a week are chosen, the time within each day may be represented as a timeline with the graphical objects arranged along that timeline as space permits, as illustrated in FIGS. 4 and 5. Moreover, in each of the different views illustrated in FIGS. 1-5, individual digital images are directly accessible for detailed viewing or editing by selection of a displayed graphical object.

The embodiments discussed above utilize tabs 101a, 102a, 103a, 104a, to navigate between year, month, week, and day views, but this is not a requirement. In another example, the calendar-based GUI 100 could be designed to zoom continuously—any subset of contiguous days in the calendar could be selected and the view resized to include only those days, resizing and possibly rearranging thumbnails for the existing space. Alternatively, a calendar-based GUI 100 may be augmented to allow a user to navigate by year increments, or to view the same date for multiple years in a single view, providing a photographic history for the selected date.

Figure 6A:
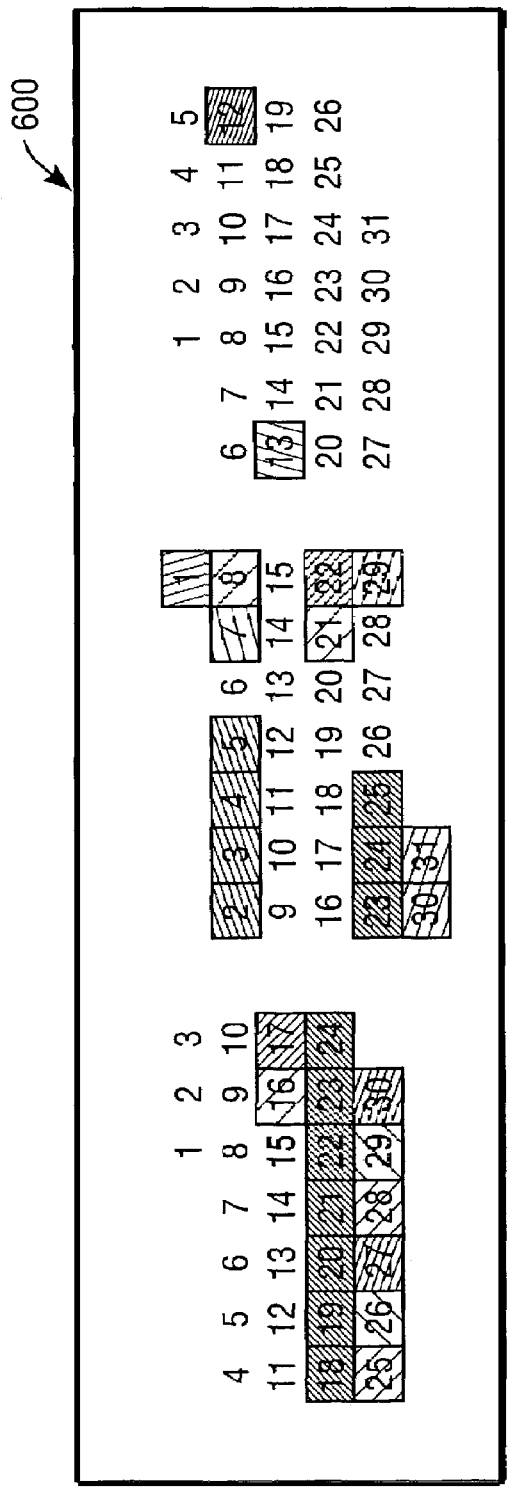
FIGS. 6A and 6B illustrate additional embodiments of calendar-based GUI.
Figure 6B:
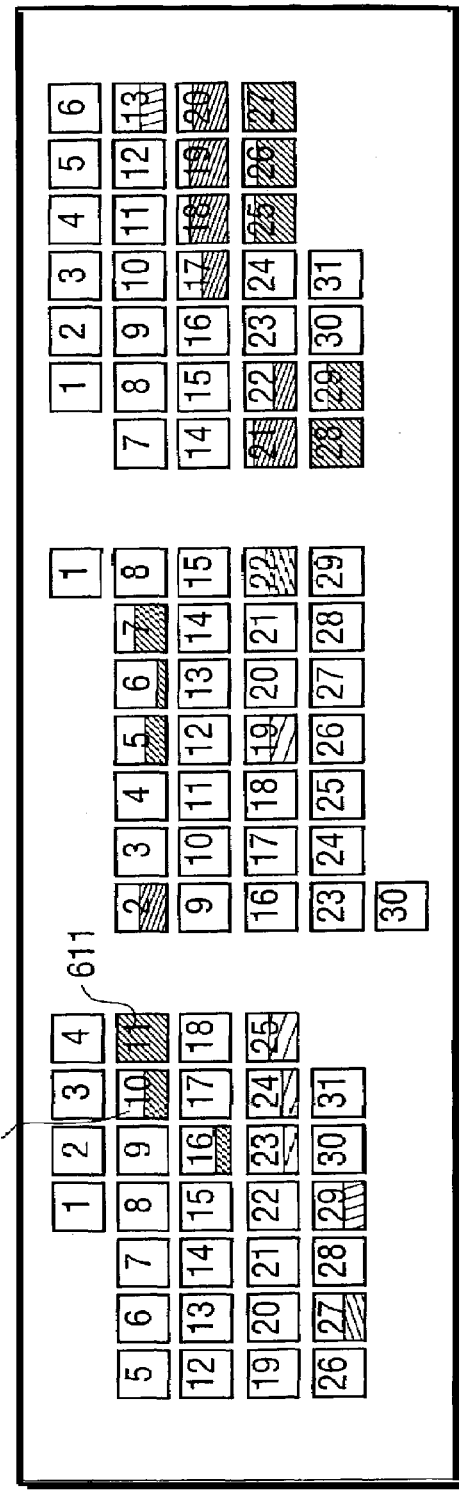
Figure 19:
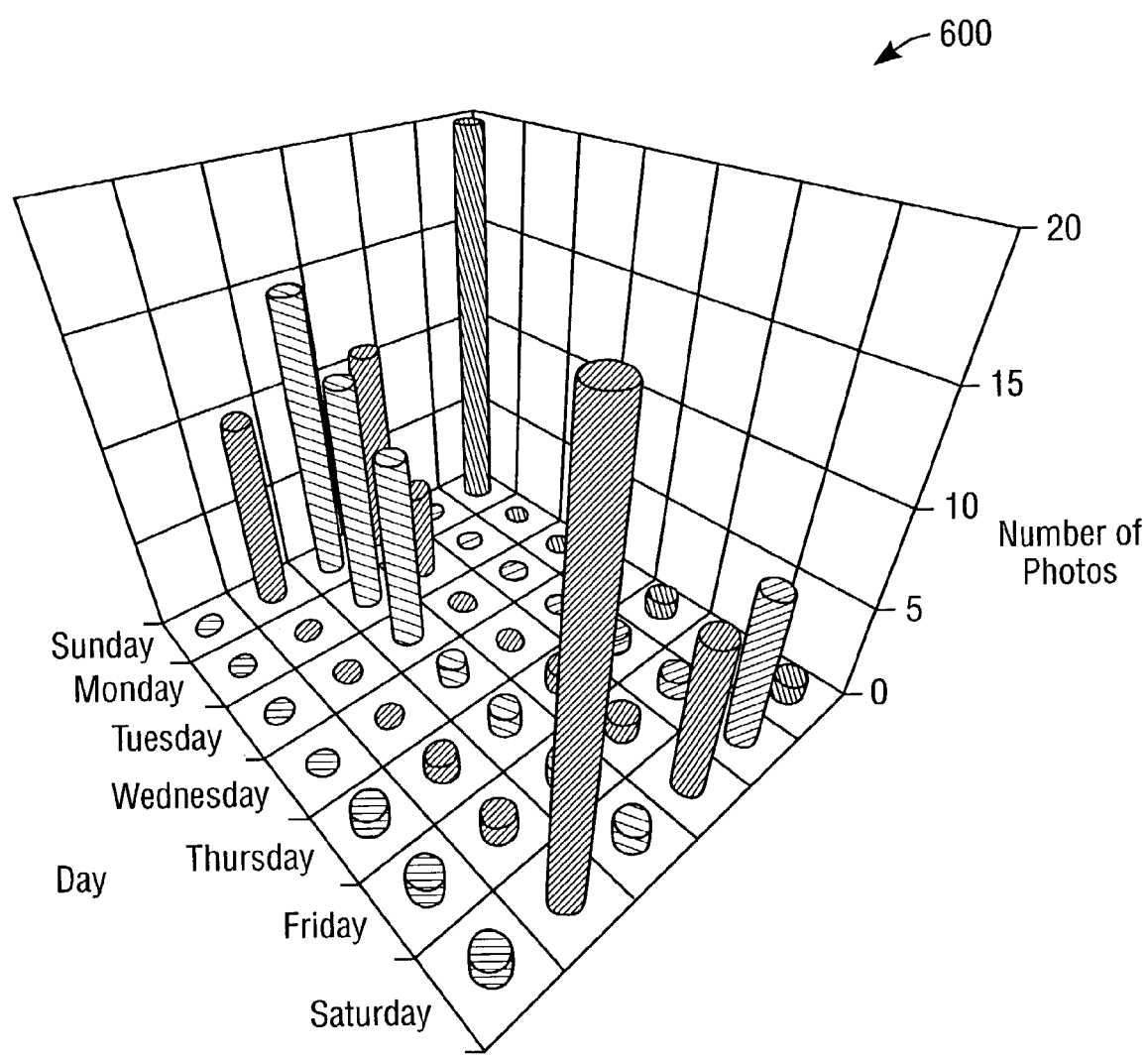
FIG. 19 illustrates an alternative representation of a calendar based graphical user interface, according to an embodiment of the present invention.

FIGS. 6A, 6B and 19 illustrate additional embodiments of a calendar-based GUI 600. In FIGS. 6A, 6B and 19, digital images are associated with different events and those associations are illustrated by displaying graphical objects for each event differently. In one example, the graphical objects are displayed in different colors and/or with different color intensities wherein the intensity of color corresponds to the number of photos represented. In FIG. 19 the calendar-based GUI is represented in a three-dimensional view and the number of digital images for a given day are illustrated by the height of the graphical object for that day. Alternatively, the graphical objects may be displayed with different characteristics or shapes. Any type of representation may be used to distinguish and/or group the graphical objects.

Additionally, as seen in FIG. 6B, the graphical objects may be illustrated as a "fill level" within each calendar day. The depth of the "fill level" represents the number of digital images associated with that graphical object. The fill level may be, but does not need to be directly proportional to the number of digital images associated with that graphical object. For example, there are more digital images associated with graphical object 611 than graphical object 610, as indicated by the depth of the fill level of each graphical object within its respective date.

Associating digital images with an event or date may be accomplished by a user or by automatic means. Days displaying the same graphical object (e.g., graphical objects with the same color) illustrate that digital images for those days are associated with the same event. The user may interact with the event boundaries to redefine the groupings, either by selecting a set of days and assigning an event name, or by dragging a start point or end point indicator within the calendar to alter the time span of the event.

Figure 7:
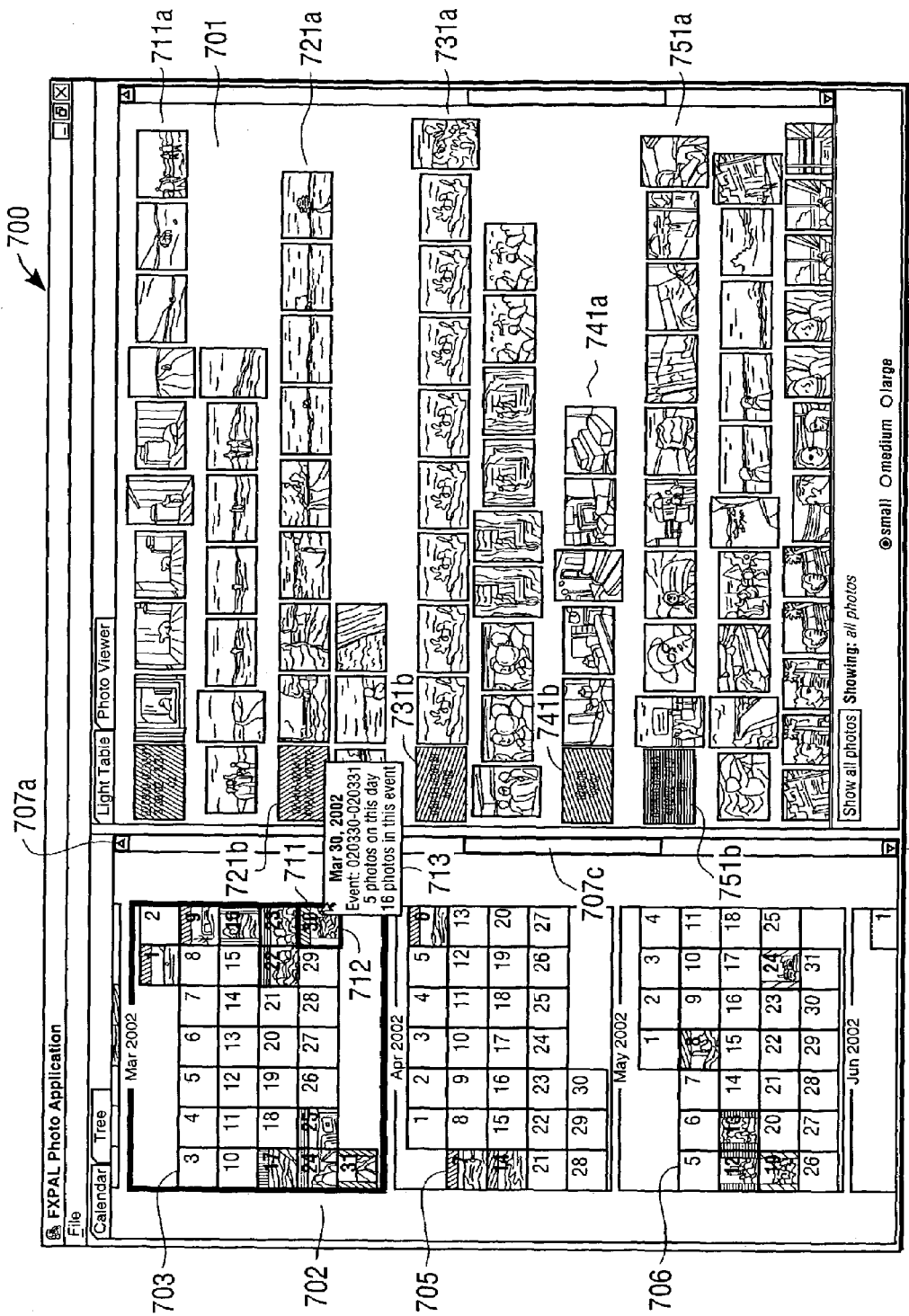
FIGS. 7-12 illustrates still other embodiments of a calendar-based GUI, according to embodiments of the present invention.

FIG. 7 illustrates still another embodiment of a calendar-based GUI 700. Calendar-based GUI 700 includes a calendar window 702 and a graphical object display window 701. As illustrated, month views 703, 705, 706 are displayed in calendar window 702. A user may control which calendar views are displayed within calendar window 702 using control arrows 707$_a$ or 707$_b$, or scroll bar 707$_c$. Graphical objects illustrated within month views 703, 705, 706 that are associated with an event include an event identifier. In one embodiment, an event identifier may be represented as a color, shape, or color intensity around or near the corresponding graphical object. For example, event identifier 711 represented around graphical object 712 identifies that the digital image(s) associated with graphical object 712 are associated with a particular event. As can be seen from pop-up window 713, event identifier 711 represents event 020330-030331 which has associated with it sixteen digital images. Additionally, pop-up window 713 identifies that five of those digital images are represented by graphical object 712.

Graphical objects representative of digital images associated with an event (referred to herein as "event groups") are displayed in graphical object display window 701. In one embodiment, only event groups corresponding to event identifiers displayed in calender view 702 are represented in window 701. For example, referring to FIG. 7, five event identifiers 711, 721, 731, 741, 751 are displayed in calendar window 702. Thus, in object display window 701 the five corresponding event groups 711$a$, 721$_a$, 731$_a$, 741$_a$, 751$_a$, are illustrated. However, in alternative embodiments, more or fewer event groups may be displayed.

Additionally, event groups may be separated/identified by a placeholder 711$_b$, 721$_b$, 731$_b$, 741$_b$, 751$_b$. Placeholders may be illustrated as identification boxes such as those represented in FIG. 7, containing information for the associated event, or as a color designation, etc.

Figure 8:
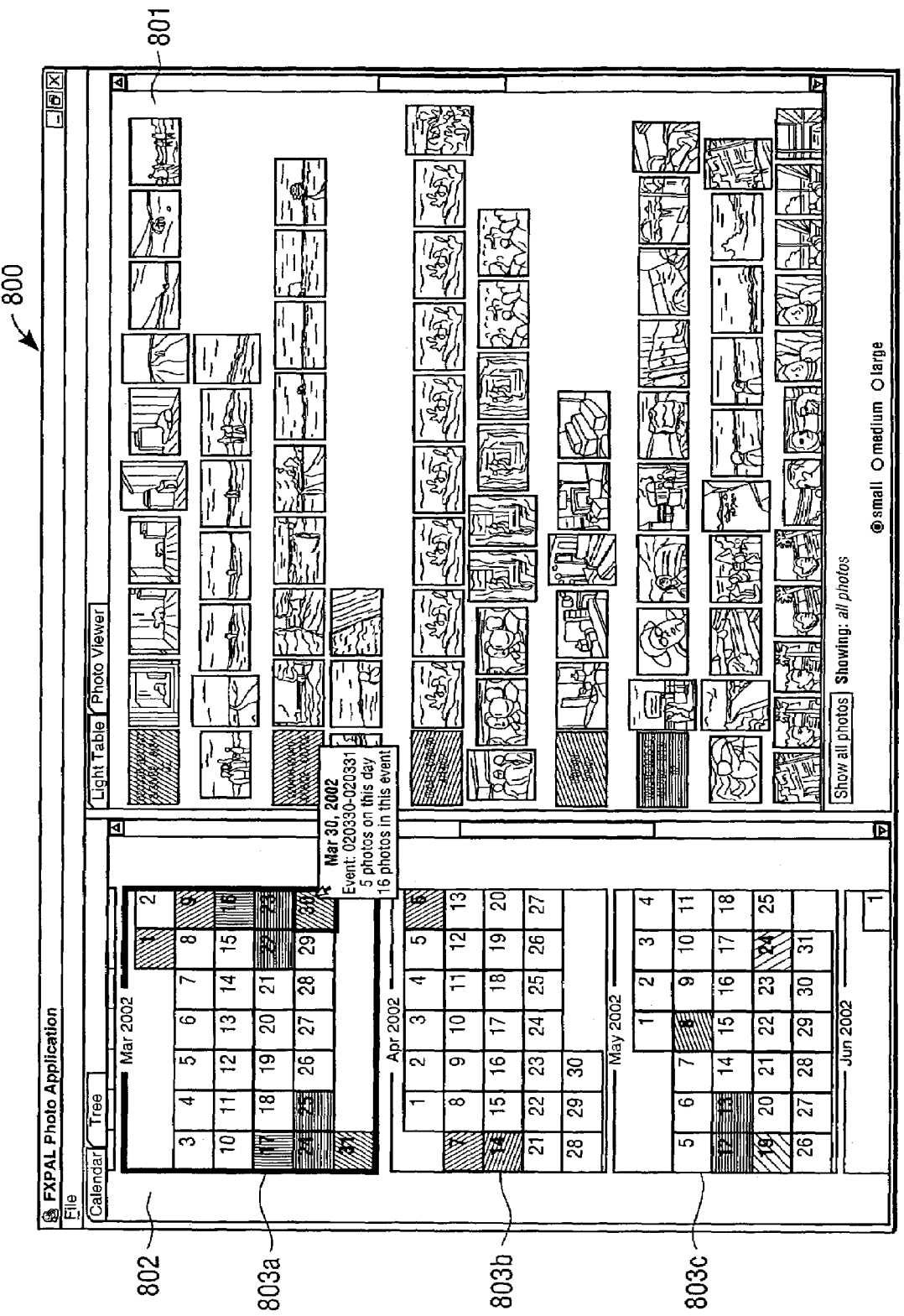

FIG. 8 illustrates an alternative view of a calendar-based GUI 800, according to an embodiment of the present invention. Calendar-based GUI 800 includes a graphical object window 801 displaying event groups and a calendar window 802 containing month view calendars 803$_a$, 803$_b$, 803$_c$. In the embodiment depicted in FIG. 8, calendars 803-803$_c$ include different events illustrated as distinct graphical objects on days that the event is associated.

In alternative embodiments, the graphical calendar illustrated in calendar window 702 (FIG. 7) and calendar window 802 (FIG. 8) may be configured in any of the arrangements described above. For example, the calendar view may be illustrated in a year view, week view, or month view.

Figure 9:
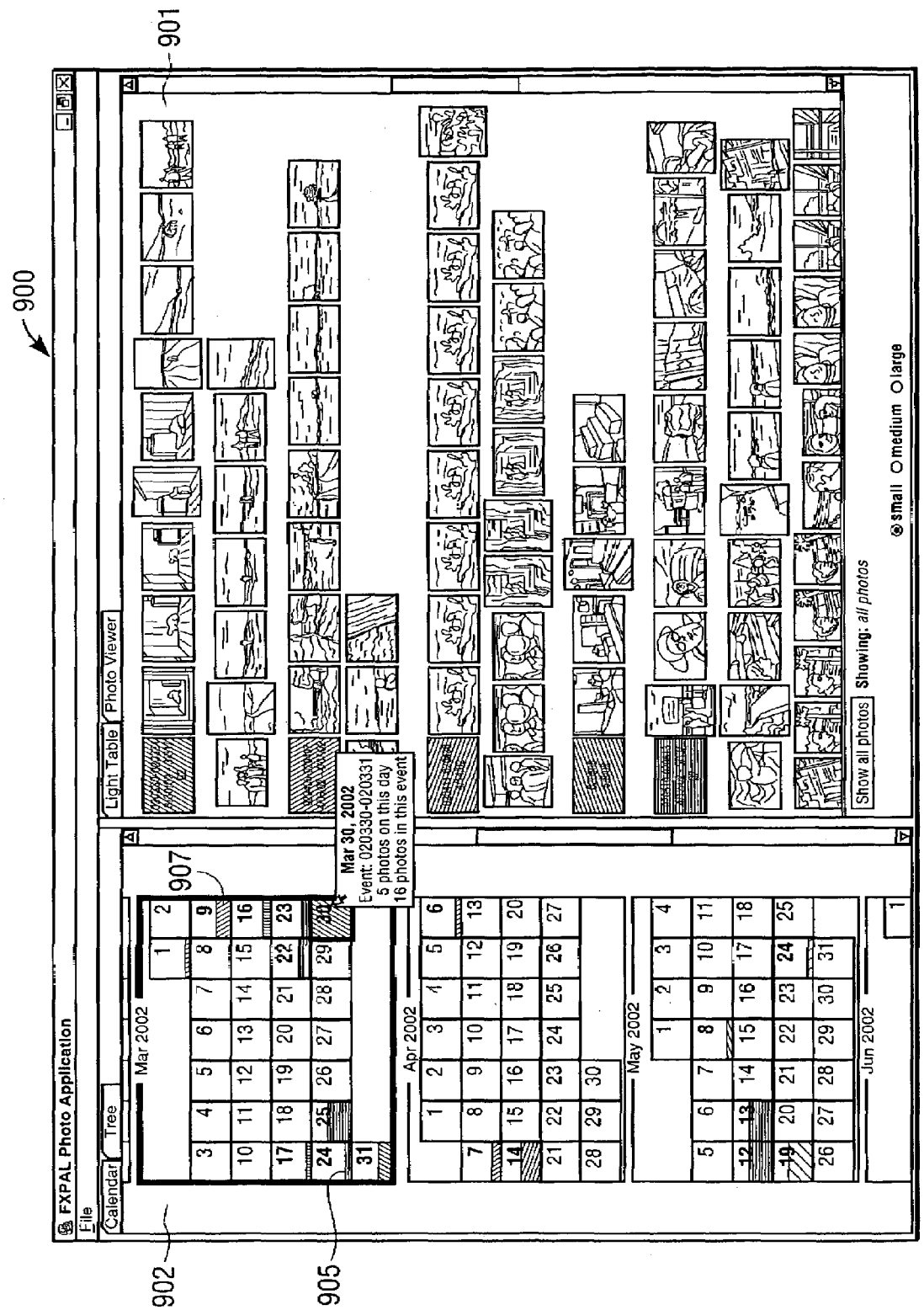

FIG. 9 illustrates another example of calendar-based GUI 900, with calendar display window 902 and graphical object window 901 according to embodiments of the present invention. In the calendar-based GUI 900 represented in FIG. 9, additional information for events is further provided by identifying events using a "fill level" graphical object within each calendar date that an event is associated. As discussed above, the "fill level" indicates the number of digital images associated with that event for that day. For example, the event that occurred on Mar. 24, 2002 illustrated by fill level 905 had fewer digital images associated with it than did the event that occurred on Mar. 9, 2002 illustrated by fill level 907.

Figure 10:
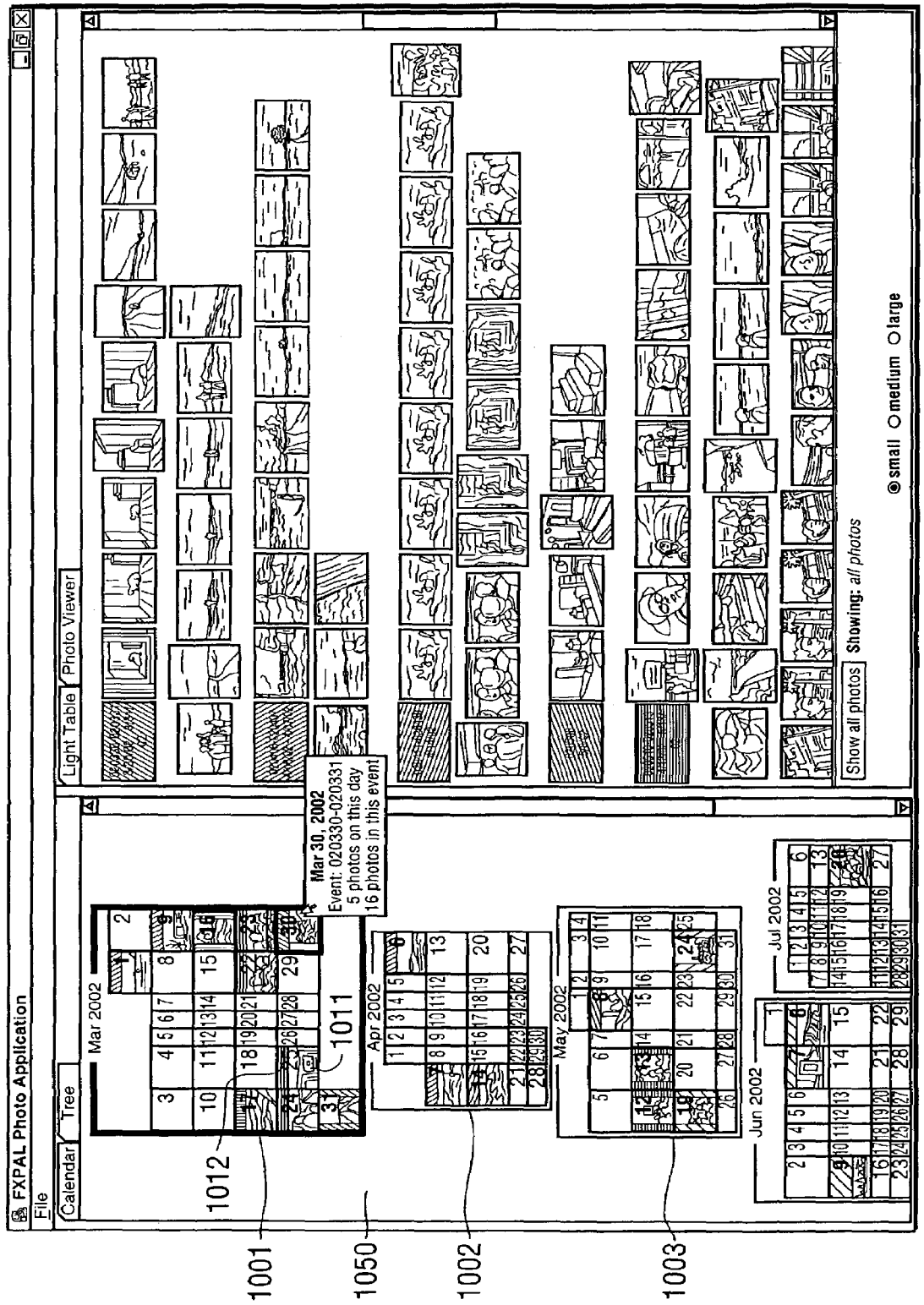
Figure 11:
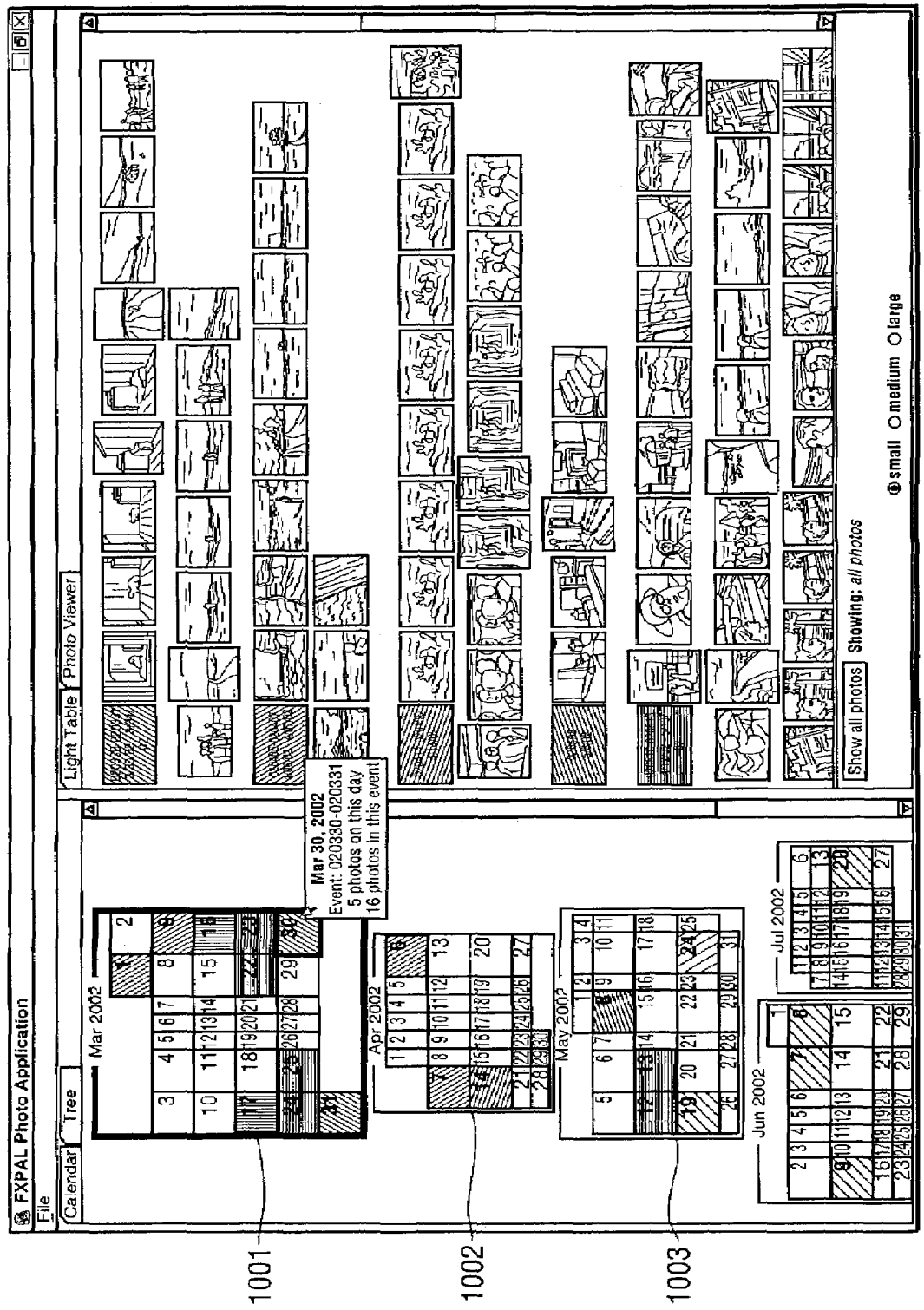
Figure 12:
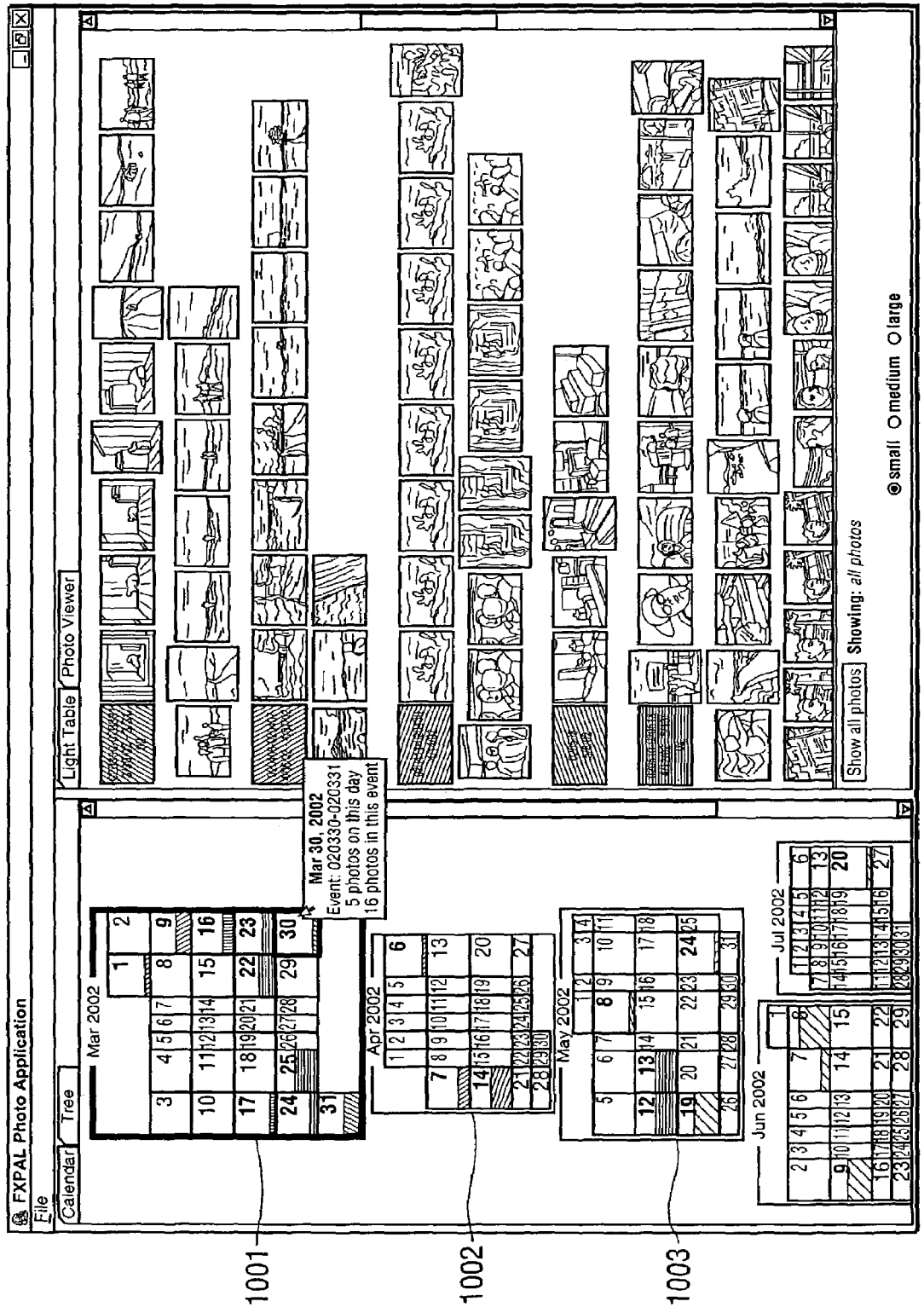

FIGS. 10-12 illustrate alternative embodiments to the calendar-based GUI discussed with respect to FIGS. 7-9. In the calendar-based GUIs represented in FIGS. 10-12 the calendar views 1001, 1002, 1003 maybe resized based upon its content. In one embodiment, there is a minimum size (height and width) for each day where it is just large enough to contain the day of the month text. If there are no digital images for a displayed month, then every day is this minimum size. Days for which digital images are associated, the space allotted to that day is increased to be large enough to show the graphical representation for those images (whether it be a one graphical representation for all images or multiple graphical representations). To preserve the rectangular geometry of other days in the month, the height of every day in the week containing a day with a graphical object is increased to the larger size, and similarly the width of every day in that column of the calendar is increased to the larger size.

For example, referring to FIG. 10, month view 1001 has digital images associated with the calendar day Mar. 25, 2002 1012 as illustrated by graphical object 1011. To display graphical object 1011 calendar day Mar. 25, 2002 1012 is increased in vertical and horizontal size and all days in the week containing calendar day Mar. 25, 2002 are also increased in vertical size. Likewise all calendar days on that day of the week (e.g. Monday) are increased in width.

Providing variable sizing of calendar views 1001, 1002, 1003 within calendar window 1050 provides a more compact representation of a month, thereby allowing more months to be viewed within the same graphical space.

Figure 13:
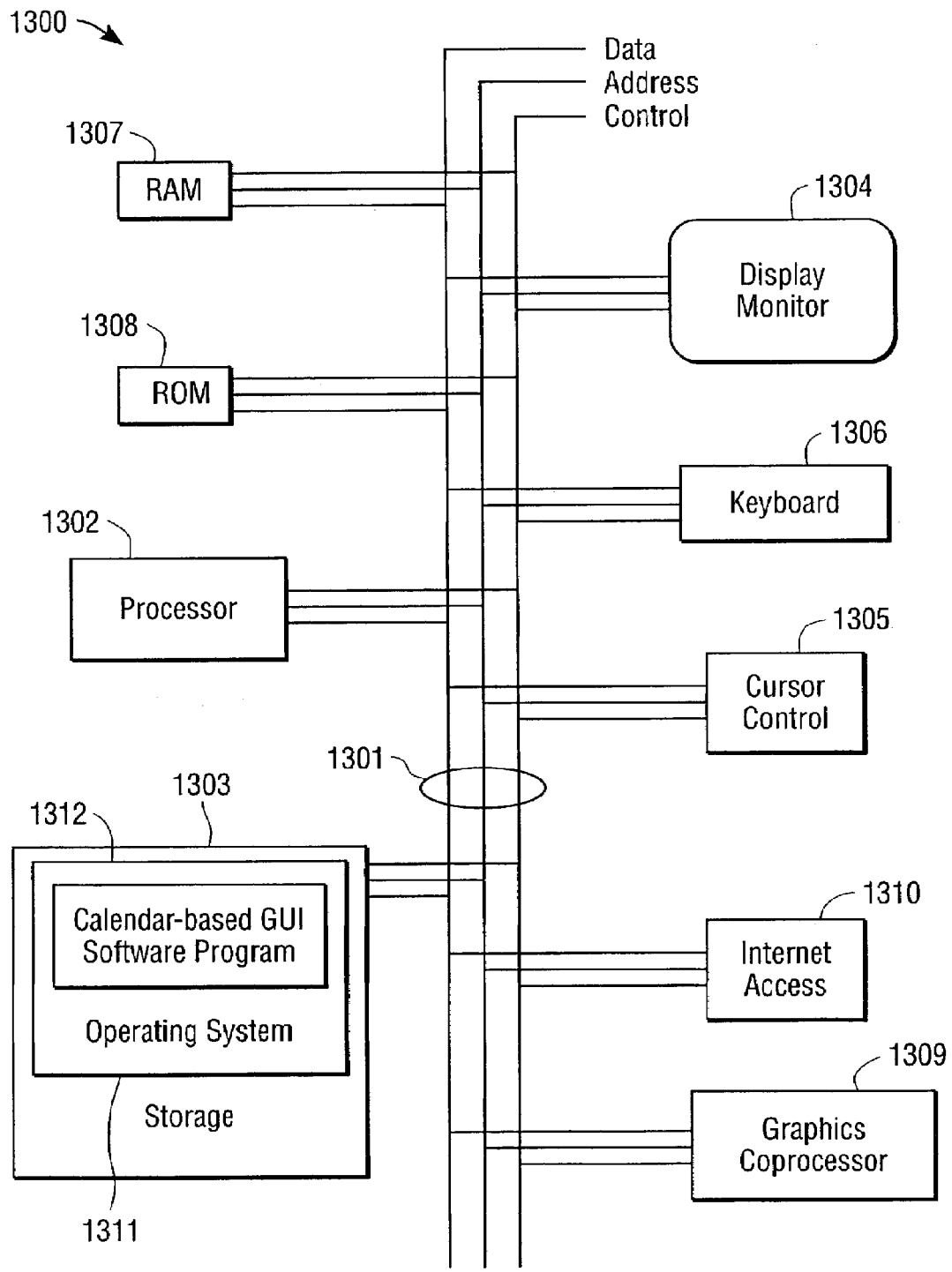
FIG. 13 illustrates a computing device architecture suitable for implementing embodiments of the present invention.

FIG. 13 illustrates a computing device architecture 1300 suitable for implementing embodiments of the present invention. The computing device architecture 1300 includes a processor 1302, a storage device 1303, and a display monitor 1304. The architecture 1300 may also include Internet access equipment 1310, such as a modem, cursor control device 1305, Random Access Memory ("RAM") 1307, Read Only Memory ("ROM") 1308, keyboard 1306, and a graphics co-processor 1309. All of the elements of the computing device architecture 1300 may be tied together by a common bus 1301 for transporting data between the various elements. The bus 1301 typically includes data, address, and control signals.

Embodiments of the present invention are executable on any computing device architecture such as the one 1300 illustrated in FIG. 13, but there is no limitation that this architecture is the only one which can execute embodiments of the present invention.

In an embodiment of the present invention, the storage device 1303 may be an article of manufacture, such as a computer readable medium. For example, storage device 1303 may be a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

Storage device 1303 may include an operating system 1311, such as Microsoft Windows®, Apple Macintosh OS®, or Unix®, wherein the operating system 1311 is capable of executing programs or applications using computing device architecture 1300. An embodiment of the present invention is implemented as calendar-based GUI software program 1312, and is stored on storage device 1303.

As will be understood, embodiments of the present invention, such as calendar-based GUI software program 1312, may be in the form of a software program, a software object, a software function, a software subroutine, a software method, a software instance, a code fragment, a hardware operation or user operation, singly or in combination. Additionally, calendar-based GUI software program 1312 may be implemented using one, two, or any number of computing devices 1300.

Figure 14:
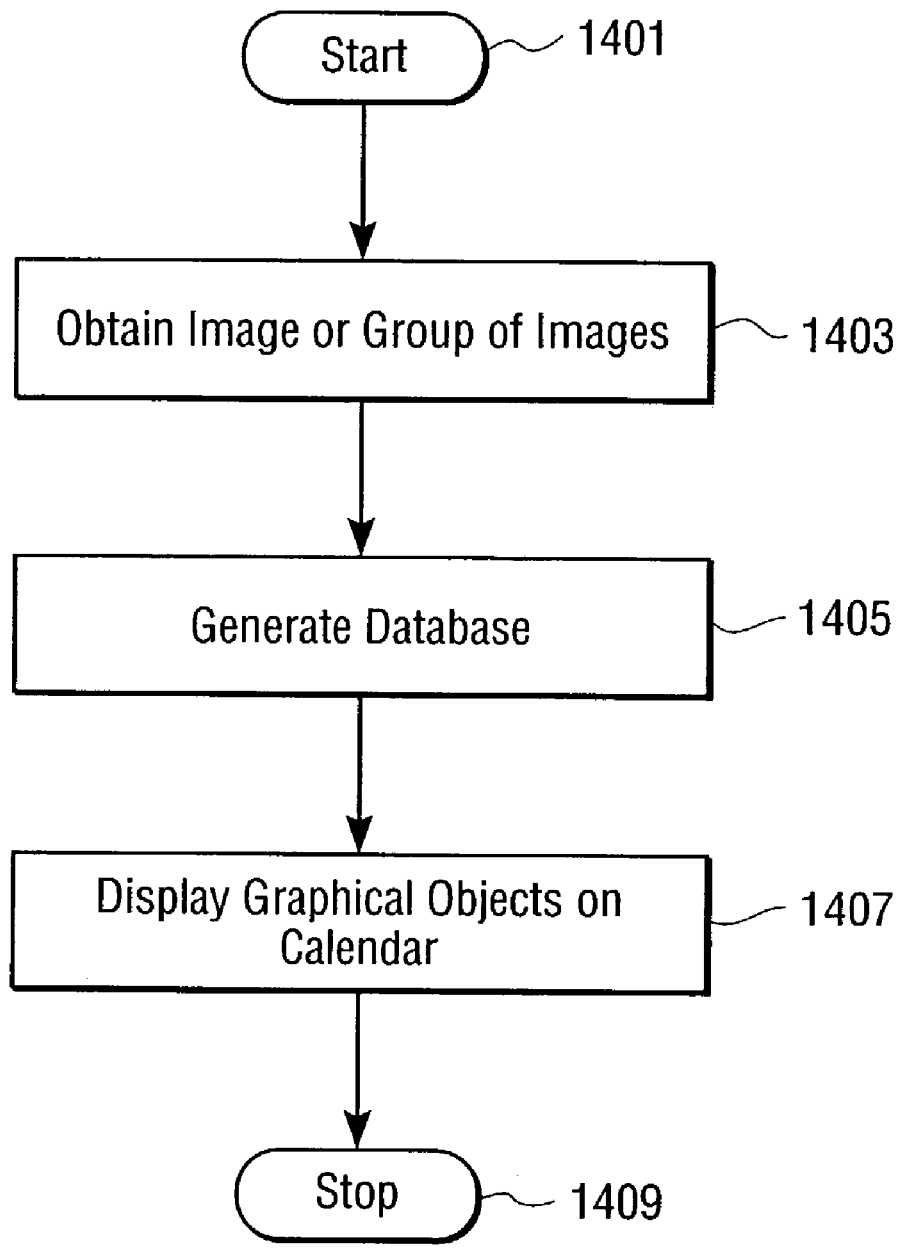
FIG. 14 illustrates a process for displaying digital images in a calendar-based GUI, according to an embodiment of the present invention.
Figure 15:
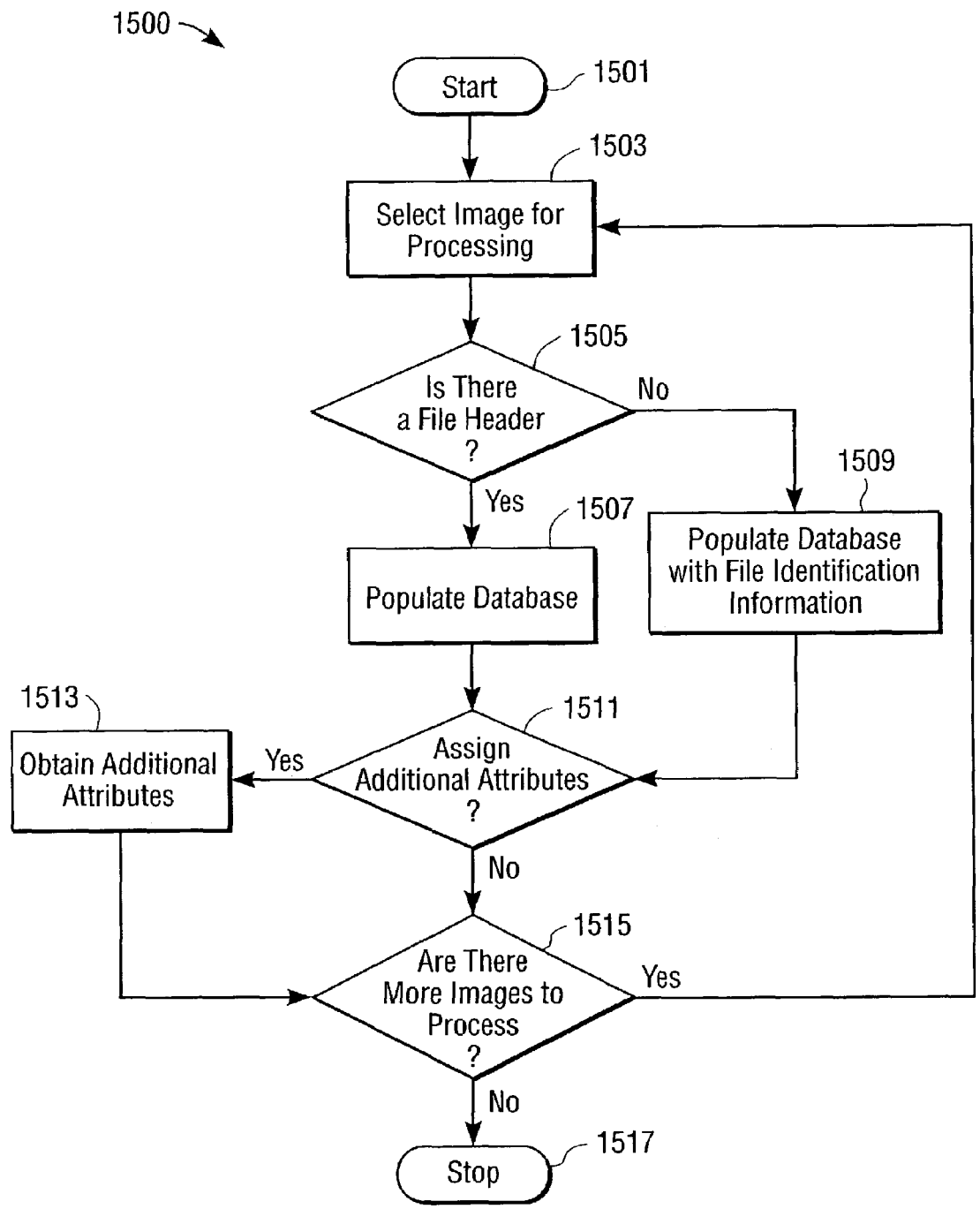
FIG. 15 illustrates a method for populating an image database with information for a collection of digital images, according to an embodiment of the present invention.
Figure 18:
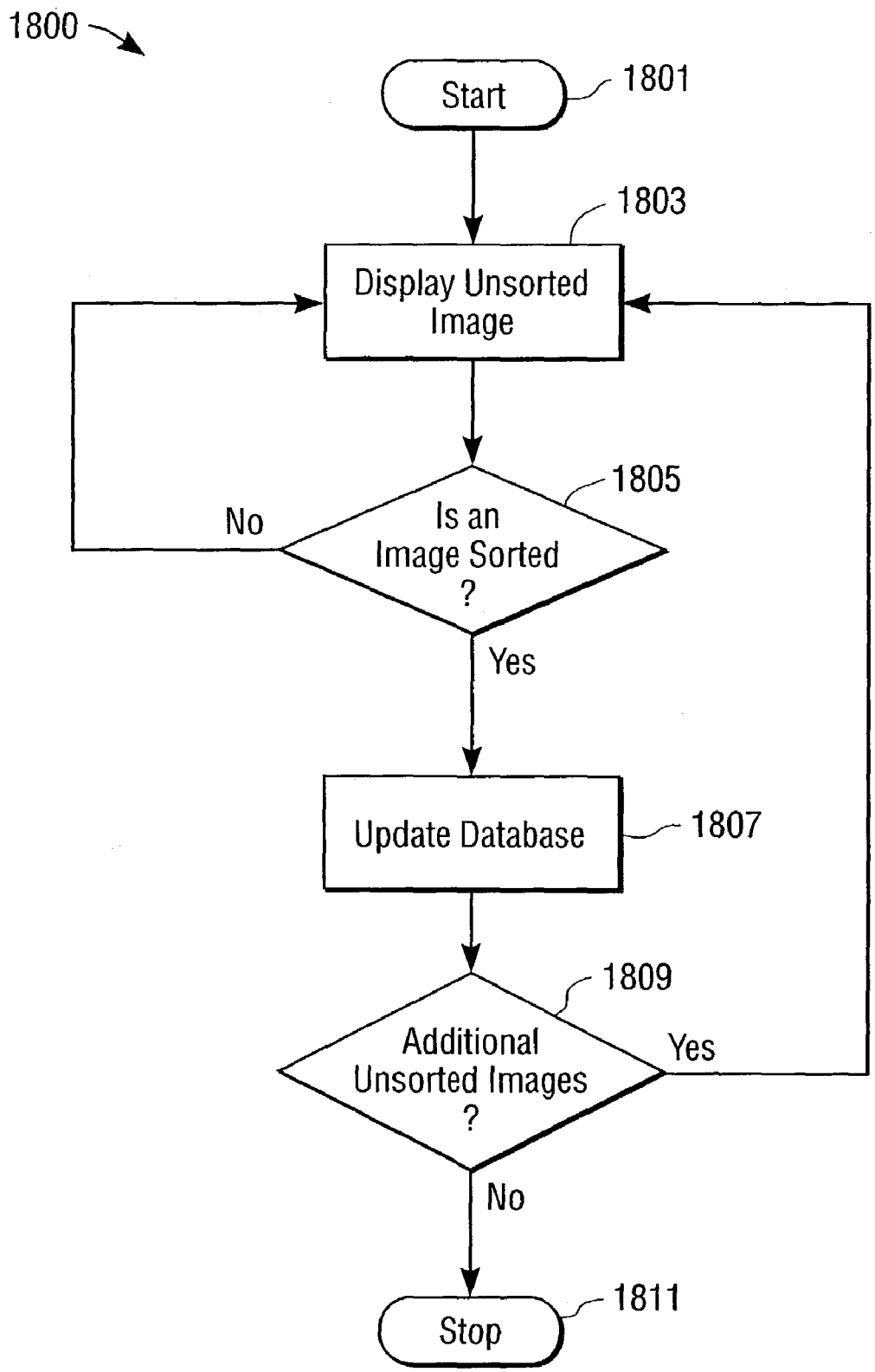
FIG. 18 illustrates a method for sorting digital images utilizing the calendar-based GUI illustrated in FIG. 17, according to an embodiment of the present invention.

FIG. 14 illustrates a process for displaying digital images in a calendar-based GUI (such as those described with respect to FIGS. 1-12), according to an embodiment of the present invention. As one who is skilled in the art would appreciate, FIGS. 14, 15, and 18 illustrate logic blocks for performing specific functions. In alternative embodiments, more or fewer logic blocks may be used. In an embodiment of the present invention, a logic block may represent a software program, a software object, a software function, a software subroutine, a software method, a software instance, a code fragment, a hardware operation or user operation, singly or in combination.

The process begins at logic block 1401 and control is passed to logic block 1403, where the system obtains a digital image or group of digital images. Control is then passed to logic block 1405 and a database is generated that describes and identifies each of the obtained digital images. Graphical objects representative of the digital images obtained in logic block 1403 are then displayed in calendar-based GUI as illustrated by logic block 1407. Each graphical object is displayed in calendar-based GUI according to the date associated with the corresponding digital image, as identified in the database created in logic block 1405. Control is then passed to logic block 1409 and the process is completed.

FIG. 15 is a detailed illustration of a method for populating an image database as discussed with respect to logic block 1405, according to an embodiment of the present invention. The method begins at logic block 1501 and control is passed to logic block 1503 where a digital image is selected from a collection of images for processing and generating information within the database. In logic block 1505, a determination is made as to whether the selected digital image includes header information. If it is determined in logic block 1505 that the selected digital image contains header information, control is passed to logic block 1507 and the database is populated with information from that header. As discussed above, information typically obtained from a header includes creation date, creation time, and often other relevant information.

If however, it is determined in logic block 1505 that there is no header information for the selected digital image, control is passed to logic block 1509 and the database may be populated with computer information regarding the file. For example, a date may be included in the database as to when the digital image was stored on the general purpose computer.

In logic block 1511, control is received from either logic block 1507 or logic block 1509 and a determination is made as to whether additional information is to be included in the database for the selected digital image. If it is determined that additional information is to be included, control is passed to logic block 1513 and the additional information is obtained and included in the database. Additional information may include an event identification, individual identification or any other type of association desired by a user. An event identification assigns an event ID to the selected digital image. Multiple digital images may be assigned the same event ID and/or multiple events may be assigned to the same digital image.

If however, it is determined in logic block 1511 that additional information is not to be included, control is passed to logic block 1515. In logic block 1515, control is received from either logic block 1511 or 1513 and a determination is made as to whether there are additional digital images to process. If it is determined that there are additional digital images to process, control is returned to logic block 1503 and the process repeated for each additional digital image. If however, it is determined that there are no additional digital images to process, control is passed to logic block 1515 and the process completes.

FIG. 16 is an example of database contents generated using the process described with respect to FIG. 15. The information illustrated in FIG. 16 identifies database generation for four different digital images 1601, 1621, 1631, 1641. The first digital image 1601, identified as P1010032.JPG 1601, includes information obtained from header information embedded within a digital image. The header information obtained from the digital image includes a creation date 1603 and creation time 1605 for digital image 1601. In particular, the creation date is illustrated as 2001: 02:01 1603, which represents that the digital image was created on Jan. 2, 2001. The creation time is illustrated as 07:00:00 1605, indicating that the digital image was taken at 7:00 a.m. Additional information obtained from the file header includes the width of the digital image illustrated as 640 1607, and the height of the digital image illustrated as 480 1609. Additional information was also assigned to digital image 1601 as can be seen by property-item key="people" 1611 and the person ID="Hilbert" 1613. Also, property key="event" 1617 illustrates that digital image 1601 was assigned to an event. The event ID 1619 was assigned with an event ID equal to 010201-010215.

Figure 17:
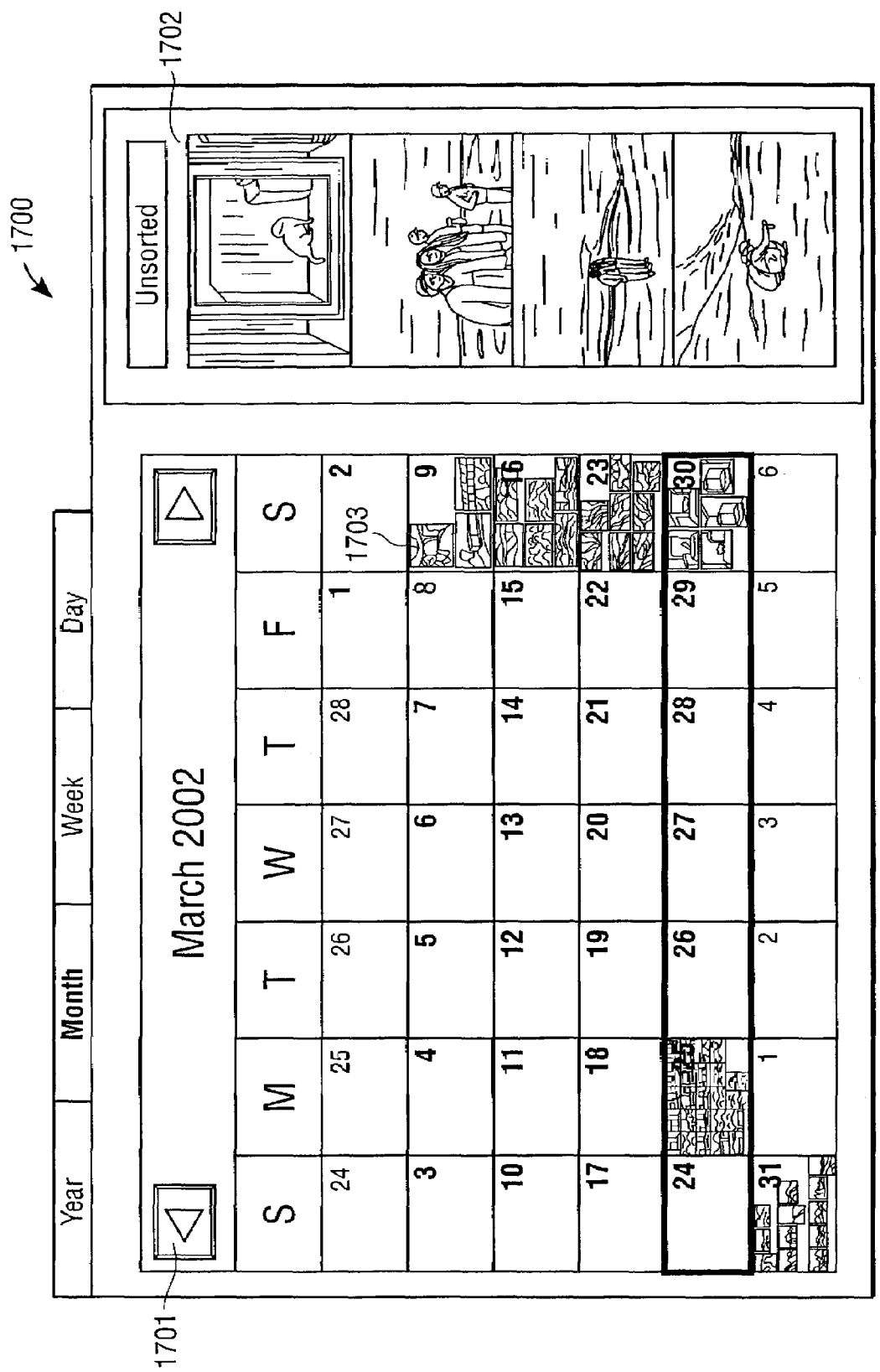
FIG. 17 illustrates another embodiment of a calendar-based GUI, according to an aspect of the invention.

FIG. 17 illustrates another embodiment of calendar-based GUI 1700. Embodiments of the present invention provide the ability to modify the date for which a digital image is associated and also provides the ability for a user to associate unsorted/undated digital images with a particular date. For example, a user may select a graphical object that represents an unsorted (undated) digital image from a group of unsorted graphical objects illustrated in window 1702 and drag it to the appropriate day in calendar view 1701.

Releasing (dropping) the selected graphical object on a day in calendar view 1701 sets the date for the digital image associated with that graphical object. The change in date may be applied to the headers of the underlying digital images and/or to a database of digital image information. Subsequent to modifying the date, the graphical object is removed from the unsorted list 1702 and displayed within the appropriate calendar date within calendar view 1701.

Additionally, graphical objects may be moved from a currently displayed location in calendar view 1701 to a different location using a similar drag and drop method. For example, graphical object 1703 could be relocated from calendar date Mar. 9, 2002 to any other calendar date, such as Mar. 1, 2002 by selecting the graphical object 1703, dragging it to the desired calendar date (e.g. Mar. 1, 2002) and releasing the graphical object. Like sorting, the date for the digital image associated with that graphical object maybe updated in the header or in a database.

Sorting images may be done in any calendar view and/or from multiple calendar views (e.g., several months, a year, week, day). As seen in FIGS. 4 and 5, when a week or a day calendar view is displayed, the time of day is also represented and the modification/placement of graphical objects onto that representation results in a change of the recorded time for the associated images.

FIG. 18 illustrates a method for sorting digital images utilizing the calendar-based GUI 1600 illustrated in FIG. 17, according to an embodiment of the present invention. The process begins at logic block 1801 and control is passed to logic block 1803, where graphical objects of unsorted/undated digital images are displayed on a calendar-based GUI as seen in FIG. 17. Control is then passed to logic block 1805 where a determination is made as to whether a user has sorted a digital image. A digital image may be sorted by a user moving one of the unsorted digital images to a calendar date resulting in that date being assigned to the sorted digital image. Additionally, a user may change a date that a sorted digital image is associated by moving the corresponding graphical object to a desired date. If a digital image has not been sorted, control is returned to logic block 1803 and the process continues.

If a digital image has been sorted or moved to a new date, control is passed to logic block 1807 and the database containing information for the digital image is updated. For example, if a digital image is relocated to a particular date within the calendar, that date is modified within the digital image database to identify a new date for that digital image. Control is then passed to logic block 1809 where a determination is made as to whether there are additional unsorted digital images. If it is determined there are additional unsorted digital images, control is returned to logic block 1803 and the process repeated. If there are no more digital images to be sorted, control is passed to logic block 1811 and the process completes.

Although FIG. 17 has been described for sorting images, any of the calendar-based GUIs discussed above may be used to sort digital images. For example, in any of FIGS. 1-12 a user may change a date that a digital image is associated by moving a displayed graphical object from one date within the calendar-based GUI to a different date. In response to such an action, the database information for the digital image(s) associated with the repositioned graphical object is updated with the new date.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A machine based graphical user interface for displaying to a user one or more graphical object having an associated date, comprising:
   a graphical calendar which includes a grid of cells; and
   said one or more graphical object displayed at a location within said graphical calendar said location being one or more cells of the grid of cells, wherein said one or more graphical object is representative of one or more digital image that corresponds to said date associated with said graphical object, wherein said graphical object is a vertical fill level, wherein the vertical height of the fill level shading in the one or more cell represents the number of digital images associated with that graphical object.

2. The graphical user interface of claim 1 wherein said associated date includes a time and wherein said graphical object representative of said digital image is displayed at a location within said graphical calendar that corresponds to said associated date and said time.

3. The graphical user interface of claim 1 wherein said graphical calendar illustrates a year view.

4. The graphical user interface of claim 1 wherein said graphical calendar illustrates a month view.

5. The graphical user interface of claim 1 wherein said graphical calendar illustrates a week view.

6. A computer based method for organizing and displaying to a user a plurality of digital images comprising the steps of:
   obtaining said plurality of digital images;
   generating a database containing information for each of said plurality of digital images;
   displaying a graphical calendar which includes a grid of cells; and,
   displaying one or more graphical objects at distinct locations within said graphical calendar, wherein one or more graphical object has a vertical fill level luminance representative of a number of said plurality of digital images, wherein the vertical fill level luminance increases with increasing number of digital images.

7. The method of claim 6 wherein the luminance is proportional to the number of said plurality of digital images represented.

8. The graphical user interface of claim 1 further comprising a depth of said fill level, where the depth of said fill level is proportional to the number of digital images associated with said graphical object.

9. A machine based method for organizing and displaying to a user a plurality of digital images comprising the steps of:
   obtaining said plurality of digital images;
   generating a database containing information for each of said plurality of digital images;
   displaying a graphical calendar which includes a grid of cells; and,
   displaying one or more graphical object at distinct cell locations within said graphical calendar grid of cells, wherein one or more graphical object is a vertical fill level, wherein the vertical height of the fill level shading in one or more cell represents the number of digital images.

10. The method of claim 9 wherein a depth of said fill level is proportional to the number of digital images associated with said graphical object.

11. The graphical user interface of claim 1, wherein said graphical object is displayed at least on a daily basis.

* * * * *